(12) United States Patent
Mortha et al.

(10) Patent No.: US 12,413,478 B2
(45) Date of Patent: Sep. 9, 2025

(54) UNIFIED TOPOLOGY ACROSS DOMAINS

(71) Applicant: CA, Inc., San Jose, CA (US)

(72) Inventors: Srinivas Mortha, Bangalore (IN); Naga Naveen Chevendra, Bangalore (IN)

(73) Assignee: CA, Inc., San Jose, CA (US)

( * ) Notice: Subject to any disclaimer, the term of this patent is extended or adjusted under 35 U.S.C. 154(b) by 42 days.

(21) Appl. No.: 18/497,503

(22) Filed: Oct. 30, 2023

(65) Prior Publication Data

US 2025/0141749 A1    May 1, 2025

(51) Int. Cl.
*H04L 41/12* (2022.01)
*H04L 41/0604* (2022.01)
*H04L 41/22* (2022.01)

(52) U.S. Cl.
CPC .......... *H04L 41/12* (2013.01); *H04L 41/0627* (2013.01); *H04L 41/22* (2013.01)

(58) Field of Classification Search
CPC ...... H04L 41/12; H04L 41/0627; H04L 41/22
See application file for complete search history.

(56) References Cited

U.S. PATENT DOCUMENTS

| | | | | |
|---|---|---|---|---|
| 2010/0094981 A1* | 4/2010 | Cordray | ................ | G06F 15/173 709/224 |
| 2023/0291640 A1* | 9/2023 | Xie | ......................... | H04L 41/12 |

FOREIGN PATENT DOCUMENTS

| | | |
|---|---|---|
| CN | 108880899 B | 11/2018 |
| CN | 109412828 B | 3/2019 |

OTHER PUBLICATIONS

Extended European Search Report on EP Appln. No. 24205198.5 dated Mar. 28, 2025.
Suleman Khan et al: "Topology Discovery in Software Defined Networks: Threats, Taxonomy, and State of the Art", IEEE Communications Surveys & Tutorials, vol. 19, No. 1, First Quarter 2017, pp. 303-324.

* cited by examiner

*Primary Examiner* — David R Lazaro
*Assistant Examiner* — Zia Khurshid
(74) *Attorney, Agent, or Firm* — Foley & Lardner LLP (57) ABSTRACT

A device to detect a first piece of equipment of a plurality of pieces of equipment, identify a first node of a plurality of nodes that represents the first piece of equipment of the plurality of pieces of equipment, receive an identification of the first piece of equipment of the plurality of pieces of equipment, update a record to include the identification of the first piece of equipment of the plurality of pieces of equipment and an indication that the first node of the plurality of nodes represents the first piece of equipment of the plurality of pieces of equipment, determine that a second piece of equipment of the plurality of pieces of equipment is absent from a first section of the plurality of sections, and query one or more devices of a plurality of devices to identify the second piece of equipment of the plurality of pieces of equipment.

20 Claims, 5 Drawing Sheets

UNIFIED TOPOLOGY ACROSS DOMAINS

BACKGROUND

The present disclosure is related to network topology and discovery of equipment connected to a distributed network.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Some embodiments are related to systems and methods for establishing a unified topology for equipment connected to a network. A topology may refer to and/or include a network topology. For example, the topology may include and/or represent physical and logical arrangements of equipment connected to a network. To continue this example, the network may include a Wide-Area Network (WAN) and the equipment may include switches and/or routers that are connected to the WAN. The topology may establish and/or indicate a placement and/or location of the equipment. For example, the topology may establish a given building that houses a router. As another example, the topology may establish how the router is connected to the network (e.g., a wired and/or wireless connection). The topology may also establish and/or indicate data flow throughout the network. For example, the topology may indicate that equipment A provides data to equipment B. The topology may include one or more nodes and the nodes may be connected and/or lined to one another. For example, the topology may include a first node and a second node. The first node may represent a first piece of equipment and the second node may represent a second piece of equipment. The topology also include links between the first piece of equipment and the second piece of equipment. The links may represent and/or otherwise indicate that the first piece of equipment and the second piece of equipment are connected to one another.

Network topologies may include one or more domains and/or sections. For example, network topologies may include network domains. The network domains may include and/or otherwise establish one or more sections of a network and/or a network topology. For example, a first building may be included in a first network domain and a second building may be included in a second network domain. As equipment is connected to a network that includes the first network domain and the second network domain, a given piece of equipment may then be associated with a given network domain. For example, a router that is located in the first building may be associated with the first network domain as a result of the router connecting to the network. To continue this example, the router may connect pieces of equipment of the first building with equipment that is associated with the second network domain. Connections between equipment across network domains may create and/or establish a distributed network.

Fault Management Systems (FMSs) may be deployed and/or implemented to monitor and/or address network security across a computer network. Distributed networks having multiple domain networks may include multiple FMSs. For example, a first network domain can be monitored by a first FMS and a second network domain can be monitored by a second FMS. Distributed systems including data, voice, application, and video services included including interconnect network technologies may have FMSs that separately manage network domains. Network domains may include overlapping and/or repeated Internet Protocol (IP) addresses which may result in a single FMS being unable to monitor security for network domains that have overlapping IP address. For example, a first network domain and a second network domain may utilize common IP address. To continue this example, a single FMS may be unable to monitor both the first network domain and the second network in part because of the overlap in IP address. Stated otherwise, because a piece of equipment in the first network domain may have the same IP address as a piece of equipment in the second network domain a single FMS may be unable to monitor both network domains.

Other systems utilization of multiple FMSs to monitor a distributed network may prevent and/or limit creation of a centralized and/or unified topology. For example, a first FMS that monitors a first network domain may be unaware of a status for a second network domain that is monitored by a second FMS. Systems with distributed networks and isolated FMSs may impact one or more aspects of network monitoring. For example, fault detection, network troubleshooting, and detection of unapproved network access may all be impacted with a distributed network.

Some technical solutions and advantages of some embodiments are related to a system including multiple devices to discover pieces of equipment connected to a network and to establish a unified network topology by querying one or more devices of the system to identify connections between one or more pieces of equipment occurring across network domains. A first device may monitor a first section (e.g., a first domain) of the network and a second device may monitor a second section (e.g., a second domain) of the network. The first device may detect pieces of equipment that are located and/or associated with the first section. For example, a router may connect, via the first section, with the network and the first device may detect the router. To continue this example, the first device may prompt the router for information that corresponds to one or more pieces of equipment that are connected to the router. The first device may create and/or generate a topology responsive to receipt of information from the router.

A system may refer to and/or include at least one of a computer network, a network topology, a Wide-Area Network (WAN), a Local Area Network (LAN), a Virtual Local Area Network (VLAN), a datacenter, an isolated network, data communications, a data network, telecommunication networks, and/or other possible computer systems, in some embodiments. In some embodiments, the system may refer to and/or include a network. A device may refer to and/or include at least one of an integrated circuit, a general purpose processor, a multicore processor, a software programmable device, a computer application, a programmable logic controller, and/or other possible circuitry and/or hardware, in some embodiments. Similarly, the functionality of the device may be stored, in memory, as software, firmware, and/or as instructions and when the information (e.g., software, firmware, and/or instructions) stored in memory are executed, by a processor, results in the processor performing the functionality of the device (e.g., the processor can detect pieces of equipment and establish a topology across a network).

Pieces of equipment may refer to and/or include at least one of network devices, routers, switches, hubs, computers, computing devices, mobile devices, desktops, laptops, servers, controllers, modems, Internet Of Things (IoT) devices, video devices, monitors, displays, tablets, printers, scanners, fax machines, gateways, ethernet jacks, bridges, network interfaces, wired jacks, network ports, and/or other possible network devices, in some embodiments. A node may refer to and/or include at least one of a connection point, a network node, a physical node, a logical node, a portion and/or segment of a network topology that represents a device, and/or other possible network device representations.

An identification of pieces of equipment may refer to and/or include at least one of a local device identification, a local port, a remote device identification, a remote port, an IP address, a chassis identification, a hello packet, device capabilities, Medium Access Control (MAC) address, VLAN name, device description, and/or other possible equipment identification, in some embodiments. A record may refer to and/or include at least one of a table, a data structure, a cache, a protocol table, a data array, and/or other possible types of information that may be stored and/or maintained in memory, in some embodiments. A database may refer to and/or include memory, memory devices, memory structures, types of memory, a collection of information, a data store, and/or other possible information structures, in some embodiments.

A query and/or querying may refer to and/or include at least one of prompting, asking, communicating with, and/or otherwise requesting one or more systems and/or one or more devices for information, in some embodiments. Receipt may refer to and/or include at least one of receiving, accepting, collecting, and/or otherwise obtaining information and/or a response, in some embodiments.

Some embodiments relate to a system. The system can include a plurality of nodes. The plurality of nodes can be distributed across a network. Respective nodes of the plurality of nodes can represent respective pieces of equipment of a plurality of pieces of equipment connected to the network. The system can also include a first device. The first device can correspond to a first section of a plurality of sections of the network. The plurality of sections of the network can be defined by a plurality of devices. The plurality of devices can include the first device. The first device can include one or more circuits. The one or more circuits can detect a first piece of equipment of the plurality of pieces of equipment. The one or more circuits can also identify a first node of the plurality of nodes that represents the first piece of equipment of the plurality of pieces of equipment. The one or more circuits can also receive, from the first piece of equipment of the plurality of pieces of equipment, an identification of the first piece of equipment of the plurality of pieces of equipment. The one or more circuits can also update, responsive to receipt of the identification, in a database, a record to include the identification of the first piece of equipment of the plurality of pieces of equipment and an indication that the first node of the plurality of nodes represents the first piece of equipment of the plurality of pieces of equipment. The one or more circuits can also determine, based on information to identify a second piece of equipment of the plurality of pieces of equipment, that the second piece of equipment of the plurality of pieces of equipment is absent from the first section of the plurality of sections. The information to identify the second piece of equipment of the plurality of pieces of equipment can be received from the first piece of equipment of the plurality of pieces of equipment. The one or more circuits can also query, responsive to determination that the second piece of equipment of the plurality of pieces of equipment is absent from the first section of the plurality of sections, via the network, one or more devices of the plurality of devices to identify the second piece of equipment of the plurality of pieces of equipment.

In some embodiments, the one or more circuits can also receive, responsive to querying the one or more devices of the plurality of devices, a response that identifies the second piece of equipment of the plurality of pieces of equipment. The response can include an identification of the second piece of equipment of the plurality of pieces of equipment, and an indication of a given section of the plurality of sections that includes the second piece of equipment of the plurality of pieces of equipment. The one or more circuits can also update, responsive to receipt of the response, the record to include the identification of the second piece of equipment of the plurality of pieces of equipment and the indication of the given section of the plurality of sections.

In some embodiments, the one or more circuits can query, via the network, the one or more devices of the plurality of devices to identify the second piece of equipment of the plurality of pieces of equipment can include generating a node to store the information to identify the second piece of equipment of the plurality of pieces of equipment. The node can be included with the plurality of nodes for a predetermined amount of time. The one or more circuits can also query, via the network, the one or more devices of the plurality of devices to identify the second piece of equipment of the plurality of pieces of equipment can also include transmitting, via the node, a message to request the one or more devices to search respective records that include information pertaining to pieces of equipment of the plurality of pieces of equipment that are included in respective sections. The one or more circuits can also query, via the network, the one or more devices of the plurality of devices to identify the second piece of equipment of the plurality of pieces of equipment can also include replacing, responsive to receipt of a response that identifies the second piece of equipment of the plurality of pieces of equipment, the node with a second node to link the first piece of equipment of the plurality of pieces of equipment with the second piece of equipment of the plurality of pieces of equipment. The second node can be previously unknown by the first device of the plurality of devices.

In some embodiments, the one or more circuits can also generate a graph to illustrate the plurality of nodes distributed across the network. The graph can include a plurality of links between respective pieces of equipment of the plurality of pieces of equipment. A link of the plurality of links between the first piece of equipment of the plurality of pieces of equipment and the second piece of equipment of the plurality of pieces of equipment can represent that the first piece of equipment of the plurality of pieces of equipment is a neighbor to the second piece of equipment of the plurality of pieces of equipment. The one or more circuits can also update, responsive to receipt of a response to querying the one or more devices of the plurality of device, the graph to include a second link between the second piece of equipment of the plurality of pieces of equipment and one or more third pieces of equipment of the plurality of pieces of equipment. The link between the first piece of equipment of the plurality of pieces of equipment and the second piece of equipment of the plurality of pieces of equipment, and the second link between the second piece of equipment of the plurality of pieces of equipment and the one or more third pieces of equipment of the plurality of pieces of equipment can represent connections between two or more sections of the plurality of sections.

In some embodiments, the one or more circuits can also detect, using the graph, a plurality of faults across the network. The one or more circuits can also implement, responsive to detection of the plurality of faults, responses to address the plurality of faults across the network. A first fault of the plurality of faults can be associated with at least one section of the plurality of sections that is different from the first section of the plurality of sections.

In some embodiments, the one or more circuits can also receive, responsive to querying the one or more devices of the plurality of devices, a response that identifies the second piece of equipment of the plurality of pieces of equipment. The one or more circuits can also identify, responsive to receipt of the response, one or more third pieces of equipment of the plurality of pieces of equipment that are connected to the second piece of equipment of the plurality of pieces of equipment via respective nodes of the plurality of nodes. The one or more circuits can also update a graph to include a first link between the first piece of equipment of the plurality of pieces of equipment and the second piece of equipment of the plurality of pieces of equipment, and one or more second links between the second piece of equipment of the plurality of pieces of equipment and the one or more third pieces of equipment of the plurality of pieces of equipment.

In some embodiments, the one or more circuits can also detect a fourth piece of equipment of the plurality of pieces of equipment. The one or more circuits can also identify a second node of the plurality of nodes that represents the fourth piece of equipment of the plurality of pieces of equipment. The one or more circuits can also determine, responsive to identification of the fourth piece of equipment of the plurality of pieces of equipment, that a fifth piece of equipment of the plurality of pieces of equipment connects the first piece of equipment of the plurality of pieces of equipment with the fourth piece of equipment of the plurality of pieces of equipment.

In some embodiments, the one or more circuits can also monitor, via a graph including links between the plurality of nodes, communication across the network to detect one or more faults. The graph can be generated by the one or more circuits by subsequent queries to the one or more devices of the plurality of devices responsive to determinations that one or more given devices of the plurality of devices are absent from the first section of the plurality of sections.

In some embodiments, the one or more circuits can also provide a prompt to the first piece of equipment of the plurality of pieces of equipment for the information to identify the second piece of equipment of the plurality of pieces of equipment. The second piece of equipment of the plurality of pieces of equipment can be in communication, via the network, with the first piece of equipment of the plurality of pieces of equipment. The first piece of equipment of the plurality of pieces of equipment can be detected via a first protocol. The prompt to the first piece of equipment of the plurality of pieces of equipment can be provided via a second protocol. The first protocol and the second protocol can be different.

Some embodiments relate to a device. The device can correspond to a first section of a plurality of sections of a network. The network can comprise a plurality of nodes distributed across the network. Respective nodes of the plurality of nodes can represent respective pieces of equipment of a plurality of pieces of equipment connected to the network. The device can include one or more circuits. The one or more circuits can detect a first piece of equipment of the plurality of pieces of equipment. The one or more circuits can also identify a first node of the plurality of nodes that represents the first piece of equipment of the plurality of pieces of equipment. The one or more circuits can also receive, from the first piece of equipment of the plurality of pieces of equipment, an identification of the first piece of equipment of the plurality of pieces of equipment. The one or more circuits can also update, responsive to receipt of the identification, in a database, a record to include the identification of the first piece of equipment of the plurality of pieces of equipment and an indication that the first node of the plurality of nodes represents the first piece of equipment of the plurality of pieces of equipment. The one or more circuits can also determine, based on information to identify a second piece of equipment of the plurality of pieces of equipment, that the second piece of equipment of the plurality of pieces of equipment is absent from the first section of the plurality of sections. The information to identify the second piece of equipment of the plurality of pieces of equipment can be received from the first piece of equipment of the plurality of pieces of equipment. The one or more circuits can also query, responsive to determination that the second piece of equipment of the plurality of pieces of equipment is absent from the first section of the plurality of sections, via the network, one or more devices of a plurality of devices to identify the second piece of equipment of the plurality of pieces of equipment.

In some embodiments, the one or more circuits can also receive, responsive to querying the one or more devices of the plurality of devices, a response that identifies the second piece of equipment of the plurality of pieces of equipment. The response can include an identification of the second piece of equipment of the plurality of pieces of equipment, and an indication of a given section of the plurality of sections that includes the second piece of equipment of the plurality of pieces of equipment. The one or more circuits can also update, responsive to receipt of the response, the record to include the identification of the second piece of equipment of the plurality of pieces of equipment and the indication of the given section of the plurality of sections.

In some embodiments, the one or more circuits can query, via the network, the one or more devices of the plurality of devices to identify the second piece of equipment of the plurality of pieces of equipment by generating a node to store the information to identify the second piece of equipment of the plurality of pieces of equipment, wherein the node is included with the plurality of nodes for a predetermined amount of time. The one or more circuits can also query, via the network, the one or more devices of the plurality of devices to identify the second piece of equipment of the plurality of pieces of equipment by transmitting, via the node, a message to request the one or more devices to search respective records that include information pertaining to pieces of equipment of the plurality of pieces of equipment that are included in respective sections. The one or more circuits can also query, via the network, the one or more devices of the plurality of devices to identify the second piece of equipment of the plurality of pieces of equipment by replacing, responsive to receipt of a response that identifies the second piece of equipment of the plurality of pieces of equipment, the node with a second node to link the first piece of equipment of the plurality of pieces of equipment with the second piece of equipment of the plurality of pieces of equipment. The second node can be previously unknown by the first device of the plurality of devices.

In some embodiments, the one or more circuits can also generate a graph to illustrate the plurality of nodes distributed across the network. The graph can include a plurality of links between respective pieces of equipment of the plurality of pieces of equipment, link of the plurality of links between the first piece of equipment of the plurality of pieces of equipment and the second piece of equipment of the plurality of pieces of equipment represents that the first piece of equipment of the plurality of pieces of equipment is a neighbor to the second piece of equipment of the plurality of pieces of equipment. The one or more circuits can also update, responsive to receipt of a response to querying the one or more devices of the plurality of device, the graph to include a second link between the second piece of equipment of the plurality of pieces of equipment and one or more third pieces of equipment of the plurality of pieces of equipment. The link between the first piece of equipment of the plurality of pieces of equipment and the second piece of equipment of the plurality of pieces of equipment, and the second link between the second piece of equipment of the plurality of pieces of equipment and the one or more third pieces of equipment of the plurality of pieces of equipment can represent connections between two or more sections of the plurality of sections.

In some embodiments, the one or more circuits can also detect, using a graph, a plurality of faults across the network. The one or more circuits can also implement, responsive to detection of the plurality of faults, responses to address the plurality of faults across the network. A first fault of the plurality of faults can be associated with at least one section of the plurality of sections that is different from the first section of the plurality of sections.

In some embodiments, the one or more circuits can also receive, responsive to querying the one or more devices of the plurality of devices, a response that identifies the second piece of equipment of the plurality of pieces of equipment. The one or more circuits can also identify, responsive to receipt of the response, one or more third pieces of equipment of the plurality of pieces of equipment that are connected to the second piece of equipment of the plurality of pieces of equipment via respective nodes of the plurality of nodes. The one or more circuits can also update a graph to include a first link between the first piece of equipment of the plurality of pieces of equipment and the second piece of equipment of the plurality of pieces of equipment, and one or more second links between the second piece of equipment of the plurality of pieces of equipment and the one or more third pieces of equipment of the plurality of pieces of equipment.

In some embodiments, the one or more circuits can also detect a fourth piece of equipment of the plurality of pieces of equipment. The one or more circuits can also identify a second node of the plurality of nodes that represents the fourth piece of equipment of the plurality of pieces of equipment. The one or more circuits can also determine, responsive to identification of the fourth piece of equipment of the plurality of pieces of equipment, that a fifth piece of equipment of the plurality of pieces of equipment connects the first piece of equipment of the plurality of pieces of equipment with the fourth piece of equipment of the plurality of pieces of equipment.

In some embodiments, the one or more circuits can also monitor, via a graph including links between the plurality of nodes, communication across the network to detect one or more faults. The graph can be generated by the one or more circuits by subsequent queries to the one or more devices of the plurality of devices responsive to determinations that one or more given devices of the plurality of devices are absent from the first section of the plurality of sections.

Some embodiments relate to a method. The method can include detecting, by one or more circuits of a first device, a first piece of equipment of a plurality of pieces of equipment. The plurality of pieces of equipment can be connected to a network. The method can also include identifying, by the one or more circuits of the first device, a first node of a plurality of nodes that represents the first piece of equipment of the plurality of pieces of equipment. The plurality of nodes can be distributed across the network. Respective nodes of the plurality of nodes can represent respective pieces of equipment of the plurality of pieces of equipment. The method can also include receiving, by the one or more circuits of the first device, from the first piece of equipment of the plurality of pieces of equipment, an identification of the first piece of equipment of the plurality of pieces of equipment. The method can also include updating, by the one or more circuits of the first device, responsive to receipt of the identification, in a database, a record to include the identification of the first piece of equipment of the plurality of pieces of equipment and an indication that the given node of the plurality of nodes represents the first piece of equipment of the plurality of pieces of equipment. The method can also include determining, by the one or more circuits of the first device, based on information to identify a second piece of equipment of the plurality of pieces of equipment, that the second piece of equipment of the plurality of pieces of equipment is absent from a first section of the plurality of sections. The information to identify the second piece of equipment of the plurality of pieces of equipment can be received from the first piece of equipment of the plurality of pieces of equipment. The method can also include querying, by the one or more circuits of the first device, responsive to determination that the second piece of equipment of the plurality of pieces of equipment is absent from the first section of the plurality of sections, via the network, one or more devices of a plurality of devices to identify the second piece of equipment of the plurality of pieces of equipment.

In some embodiments, the method can also include generating, by the one or more circuits of the first device, a graph to illustrate the plurality of nodes distributed across the network. The graph can include a plurality of links between the respective pieces of equipment of the plurality of pieces of equipment. A link of the plurality of links between the first piece of equipment of the plurality of pieces of equipment and the second piece of equipment of the plurality of pieces of equipment can represent that the first piece of equipment of the plurality of pieces of equipment is a neighbor to the second piece of equipment of the plurality of pieces of equipment. The method can also include updating, by the one or more circuits of the first device, responsive to receipt of a response to querying the one or more devices of the plurality of device, the graph to include a second link between the second piece of equipment of the plurality of pieces of equipment and one or more third pieces of equipment of the plurality of pieces of equipment. The link between the first piece of equipment of the plurality of pieces of equipment and the second piece of equipment of the plurality of pieces of equipment, and the second link between the second piece of equipment of the plurality of pieces of equipment and the one or more third pieces of equipment of the plurality of pieces of equipment can represent connections between two or more sections of the plurality of sections.

In some embodiments, the method can also include detecting, by the one or more circuits of the first device, using the graph, a plurality of faults across the network. The method can also include implementing, by the one or more circuits of the first device, responsive to detecting the plurality of faults, responses to address the plurality of faults across the network. A first fault of the plurality of faults can be associated with at least one section of the plurality of sections that is different from the first section of the plurality of sections.

Figure 1:
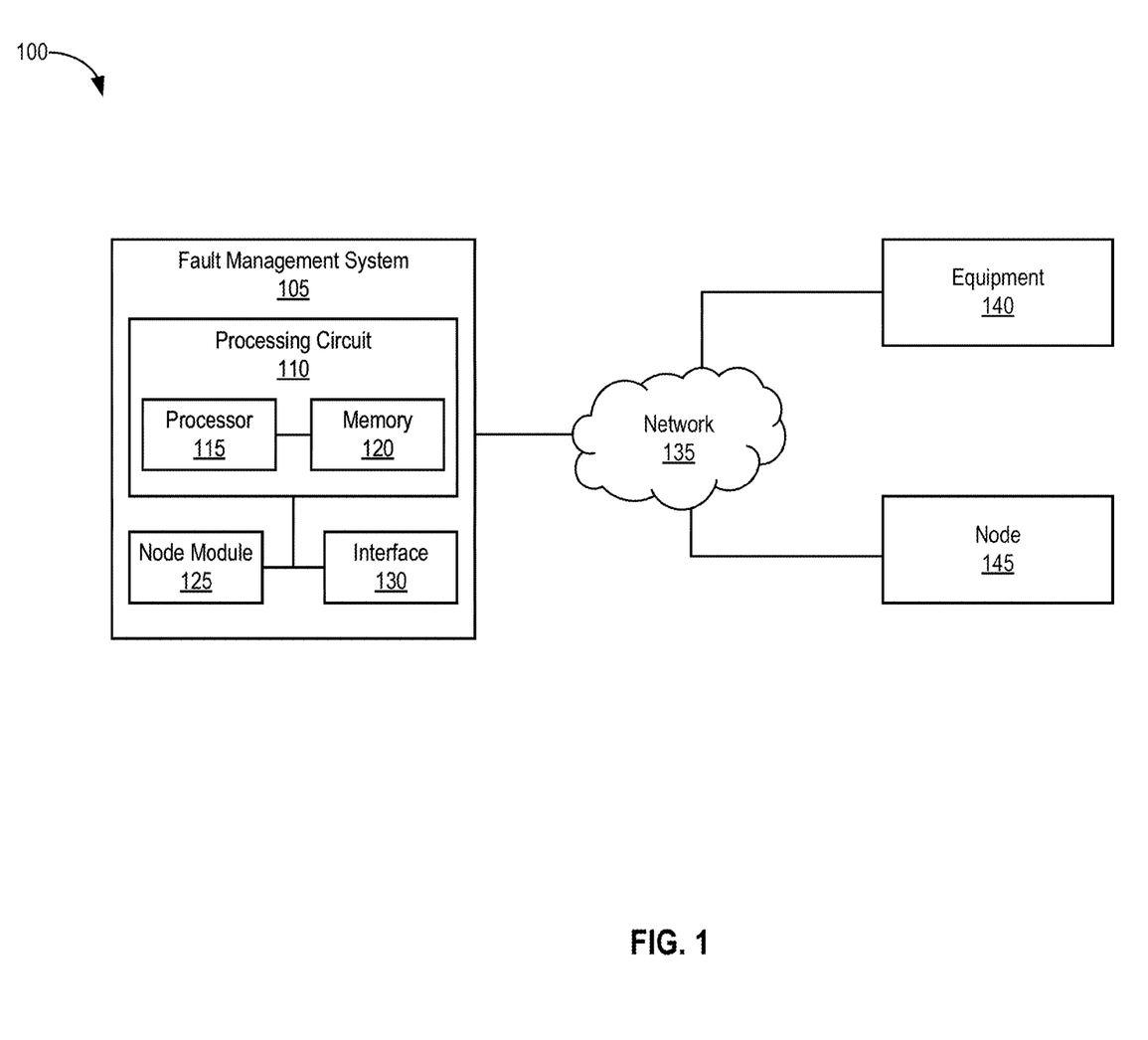
FIG. 1 is a block diagram of a system for discovering equipment connected to a network, according to some embodiments.

FIG. 1 depicts a block diagram of a system 100, according to some embodiments. Each system, device, and/or component of the system 100 may include one or more processors, memory, network interfaces, communication interfaces, and/or user interface. In some embodiments, the memory may store programming logic that, when executed by the processors, controls the operation of the corresponding system, device, and/or component. Memory can also store data in databases. The network interfaces may allow the systems and/or components of the system 100 to communicate wirelessly. The communication interfaces may include wired and/or wireless communication interfaces and the systems and/or components of the system 100 may be connected via the communication interfaces. The various components in the system 100 may be implemented via hardware (e.g., circuitry), software (e.g., executable code), or any combination thereof. Systems, devices, and components in FIG. 1 may be added, removed, modified, separated, combined, rearranged, deleted, integrated, and/or adjusted. For example, a first device that is shown to include a first component and a second component may be modified so that the first component and the second component are provided as a single component. As another example, a device that is shown to be included within a first system may also be added to a second system.

In some embodiments, the system 100 may include at least one Fault Management System (FMS) 105, at least one network 135, at least one piece of equipment 140 and/or equipment 140, and at least one node 145. In some embodiments, the network 135 may refer to and/or include wired and/or wireless telecommunications. The network 135 may include at least one of the various networks described herein. For example, the network 135 may include Wide-Area Networks (WANs). As another example, the network 135 may include Local Area Networks (LANs). In some embodiments, the equipment 140 may include at least one of the various types and/or pieces of equipment described herein. For example, the equipment 140 may include at least one of routers, switches, bridges, hubs, and/or gateways.

In some embodiments, the nodes 145 may include at least one of the various nodes described herein. For example, the nodes 145 may include network topology nodes. In some embodiments, the nodes 145 may include physical and/or logical nodes. For example, a first node 145 may represent and/or be associated with a first piece of equipment 140 and a second node 145 may represent and/or be associated with a second piece of equipment 140. In some embodiments, the nodes 145 may be distributed across the network 135. For example, the network 135 may include multiple network domains and the nodes 145 may be included in one or more network domains of the network 135. In some embodiments, the nodes 145 may represent one or more pieces of equipment 140.

In some embodiments, the nodes 145 may be connected to one another via the network 135. For example, a first piece of equipment 140 may connect to the network 135 and the network 135 may connect the first piece of equipment 140 with a second piece of equipment 140. To continue this example, the first piece of equipment 140 and the second piece of equipment 140 may communicate with another via the network 135.

In some embodiments, the FMS 105 may refer to and/or include the device described herein. For example, the FMS 105 may establish a unified topology. In some embodiments, the FMS 105 may include multiple FMSs 105. For example, the FMS 105 may include a first FMS 105 and a second FMS 105. To continue this example, the first FMS 105 may correspond to a first section (e.g., a first domain) of the network 135 and the second FMS 105 may correspond to a second section (e.g., a second domain) of the network 135.

In some embodiments, the FMS 105 may include at least one processing circuit 110, at least one node module 125, and at least one interface 130. The processing circuit 110 may refer to and/or include at least one of the circuits and/or processing circuits described herein. In some embodiments, the processing circuits 110 may include at least one processor 115 and memory 120. Memory 120 may refer to and/or include one or more devices (e.g., RAM, ROM, Flash memory, hard disk storage) for storing data and/or computer code for completing and/or facilitating the various processes described herein. Memory 120 may be and/or include non-transient volatile memory, non-volatile memory, and non-transitory computer storage media. Memory 120 may include database components, object code components, script components, or any other type of information structure for supporting the various activities and information structures described herein. Memory 120 may be communicably coupled to the processors 115 and memory 120 may include computer code or instructions (e.g., firmware or software) for executing one or more processes described herein.

The processors 115 may be implemented as one or more application specific integrated circuits (ASICs), field programmable gate arrays (FPGAs), a group of processing components, or other suitable electronic processing components. Memory 120 may store one or more instructions that, when executed by the processors 115, cause the processors 115 to perform one or more of the various operations described herein. In some embodiments, memory 120 may store, keep, and/or maintain at least one of records, tables, databases, data structures, and/or collections of information.

In some embodiments, the node module 125 may interface with and/or otherwise communicate with the processing circuit 110 and/or the interface 130. For example, the node module 125 may be communicably coupled with the processing circuit 110. In some embodiments, the processing circuit 110 may include the node module 125 and/or the interface 130. In some embodiments, the processing circuit 110 may perform similar operations to that of the node module 125 and/or the interface 130. For example, memory 120 may store instructions that, when executed by the processors 115, cause the processors 115 to perform operations similar to that of the node module 125.

In some embodiments, the interface 130 may include at least one of network communication devices, network interfaces, and/or other possible communication interfaces. The interface 130 may include wired or wireless communications interfaces (e.g., jacks, antennas, transmitters, receivers, transceivers, wire terminals, etc.) for conducting data communications with various systems, devices, and/or components described herein. The interface 130 may include direct (e.g., local wired or wireless communications) and/or via a communications network (e.g., the network 135). For example, the interface 130 may include an Ethernet card and port for sending and receiving data via an Ethernet-based communications link or network. The interface 130 may include a Wi-Fi transceiver for communicating via a wireless communications network (e.g., the network 135). The interface 130 may include a power line communications interface. The interface 130 may include an Ethernet interface, a Universal Serial Bus (USB) interface, a serial communications interface, and/or a parallel communications interface. In some embodiments, the interface 130 may connect and/or integrate the FMS 105 with the network 135. For example, the FMS 105 may communicate with one or more pieces of equipment 140 that are connected to the network 135 with the interface 130.

In some embodiments, the node module 125 may detect one or more pieces of equipment. For example, the node module 125 may detect the equipment 140. In some embodiments, the node module 125 may detect the equipment 140 responsive to the equipment 140 connecting to the network 135. For example, the node module 125 may monitor the network 135 and the node module 125 may detect an IP address. To continue this example, the node module 125 may detect the equipment 140 responsive to detecting the IP address. In some embodiments, the node module 125 may detect multiple pieces of equipment. For example, the node module 125 may detect a first piece of equipment 140 and a second piece of equipment 140.

In some embodiments, the node module 125 may identify one or more nodes. For example, the node module 125 may identify a first node 145 that represents a first piece of equipment 140. In some embodiments, the node module 125 may identify nodes during device discovery. For example, the node module 125 may identify nodes responsive to detecting the equipment 140. In some embodiments, the node module 125 may prompt the equipment 140 for information associated with one or more pieces of equipment 140. For example, the node module 125 may implement pushing and/or polling techniques that correspond to one or more protocols. As another example, the node module 125 may implement Link Layer Discovery Protocol (LLDP) while detecting, identifying, and/or prompting the equipment 140.

In some embodiments, the node module 125 may receive one or more responses from the equipment 140. For example, the node module 125 may prompt the equipment 140 for information and the equipment 140 may provide a response to the node module 125. In some embodiments, the node module 125 may receive identification information that pertains to the equipment 140. For example, the node module 125 may receive responses that correspond to one or more protocols. As another example, the node module 125 may receive a packet and the packet may include information that identifies the equipment 140.

In some embodiments, the node module 125 may update one or more records. For example, memory 120 may house, store, and/or keep a cache (e.g., a record) and the node module 125 may update the cache. As another example, memory 120 may include a data structure and the node module 125 may update the data structure. In some embodiments, memory 120 may include a database and the node module 125 may update a record that is stored in the database. In some embodiments, the cache may include chassis ID's that correspond to one or more pieces of equipment 140 and the node module 125 may update the cache to include chassis ID for detected pieces of equipment 140. For example, the node module 125 may receive the chassis IDs from the equipment 140.

In some embodiments, the node module 125 may update one or more records (e.g., caches) to include one or more identifications for equipment and/or indications of corresponding nodes. For example, the node module 125 may detect a first piece of equipment 140 and the node module 125 may identify a given node 145 that represents the first piece of equipment 140. To continue this example, the node module 125 may receive, from the first piece of equipment 140, a response that includes identification information for the first piece of equipment 140. Furthermore, the node module 125 may update a record to include the identification of the first piece of equipment 140 and an indication that the given node 145 represents the first piece of equipment 140.

In some embodiments, the equipment 140 may provide responses that include information pertaining to one or more neighbors. Neighbors may refer to and/or include pieces of equipment that are connected to one another. For example, a first piece of equipment 140 may be connected to a second piece of equipment 140. To continue this example, the first piece of equipment 140 and the second piece of equipment 140 may be considered neighbors. In some embodiments, neighbors may be connected to one another via one or more nodes 145. For example, a node given node 145 may connect a first piece of equipment 140 with a second piece of equipment 140. In some embodiments, the equipment 140 may store and/or maintain information that pertains to neighbors. For example, the first piece of equipment 140 may store a chassis ID that pertains to the second piece of equipment 140.

In some embodiments, the node module 125 may determine that one or more pieces of equipment 140 are absent from a given section of the network 135. For example, the node module 125 may receive a response from a first piece of equipment 140 and the response may include a chassis ID for a second piece of equipment 140. To continue this example, the node module 125 may determine that the second piece of equipment 140 is absent from a given section of the network 135. Stated otherwise, the first piece of equipment 140 and the second piece of equipment 140 may be connected to one another (e.g., neighbors) however the second piece of equipment 140 and the first piece of equipment 140 may be included in different network domains. In some embodiments, the node module 125 may determine that the second piece of equipment 140 is absent from the given section of the network 135 in response to the chassis ID, for the second piece of equipment 140, being absent from the cache.

In some embodiments, the node module 125 may query one or more systems and/or one or more devices. For example, the node module 125 may query one or more FMSs 105 and the FMSs 105 may correspond to, represent, and/or monitor one or more sections of the network 135. For example, the node module 125 (e.g., the FMS 105) may correspond to a first section (e.g., a first domain) of the network 135 and the node module 125 may query one or more FMSs 105 that correspond to one or more second sections (e.g., second domains) of the network 135.

In some embodiments, the node module 125 may provide, via the queries, the identification associated with the second piece of equipment 140. For example, the node module 125 may provide the chassis ID to the one or more FMSs 105. As another example, the node module 125 may provide an LLDP remote device ID to the one or more FMSs 105.

In some embodiments, the node module 125 may receive one or more responses. For example, the node module 125 may receive responses from the one or more FMSs 105. In some embodiments, the node module 125 may receive the responses responsive to querying the one or more FMSs 105. In some embodiments, the responses may identify the second piece of equipment 140. For example, the node module 125 may receive, from a given FMS 105, a response and the response may identify the second piece of equipment 140. As another example, the response may identify a source port node and a destination port node.

In some embodiments, the node module 125 may update the record to include the information provided by the one or more FMSs 105. For example, the node module 125 may update the cache to include the information that pertains to the second piece of equipment 140. As another example, the node module 125 may update the cache to include an indication of a given section (e.g., a given domain) of the network 135 that includes the second piece of equipment 140.

In some embodiments, the node module 125 may generate a graph. For example, the node module 125 may generate and/or establish a network topology. In some embodiments, the graph may include and/or illustrate the nodes 145. For example, the graph may include nodes 145 that represent the equipment 140. In some embodiments, the graph may include one or more links. For example, a first node 145 may be connected to a second node 145 via a link (e.g., a connection). In some embodiments, a link between a first node 145 and a second node 145 may represent that a first piece of equipment 140 (represented by the first node 145) is a neighbor to a second piece of equipment 140 (represented by the second node 145).

In some embodiments, the node module 125 may update the graph. For example, the node module 125 may update the graph to add links between the equipment 140. As another example, the node module 125 may update the graph to include a link between the first piece of equipment 140 and the second piece of equipment 140. In some embodiments, the node module 125 may add (e.g., update) links to the graph responsive to the node module 125 receiving responses from the one or more FMSs 105. In some embodiments, a first piece of equipment 140 may be included in a first domain and a second piece of equipment 140 may be included in a second domain. A link between the first piece of equipment 140 and the second piece of equipment may represent a connection between two or more sections. Stated otherwise, the link may represent that the first piece of equipment 140 is included in the first domain and that the second piece of equipment 140 is included in the second domain.

In some embodiments, the node module 125 may receive responses that identify one or more neighbors. For example, the node module 125 may query the one or more FMSs 105 to receive information pertaining to a given piece of equipment 140. To continue this example, the node module 125 may receive information that identifies the given piece of equipment 140 and information that identifies neighbors of the given piece of equipment 140. In some embodiments, the node module 125 may identify the neighbors of the given piece of equipment 140. For example, the response may include a chassis ID for the given piece of equipment and chassis IDs for the neighbors.

In some embodiments, the node module 125 may update the graph to include links between the equipment 140. For example, the node module 125 may detect a first piece of equipment 140 and the node module 125 may update the graph to include a node 145 that represents the first piece of equipment 140. To continue this example, the first piece of equipment 140 may provide information that identifies a second piece of equipment 140 (e.g., a neighbor). Furthermore, the node module 125 may update the graph to include a node 145 that represents the second piece of equipment 140 and a link between the first piece of equipment 140 and the second piece of equipment 140.

In some embodiments, the node module 125 may detect the pieces of equipment 140 via one or more protocols. For example, the node module 125 may detect a first piece of equipment 140 via Simple Network Management Protocol (SNMP). As another example, the node module 125 may prompt the first piece of equipment 140 via LDDP. In some embodiments, the node module 125 may identify one or more pieces of equipment 140 via a first protocol. The node module 125 prompt the one or more pieces of equipment 140 via a second protocol. In some embodiments, the first protocol and the second protocol may be the same. In some embodiments, the first protocol and the second protocol may be different.

Figure 2:
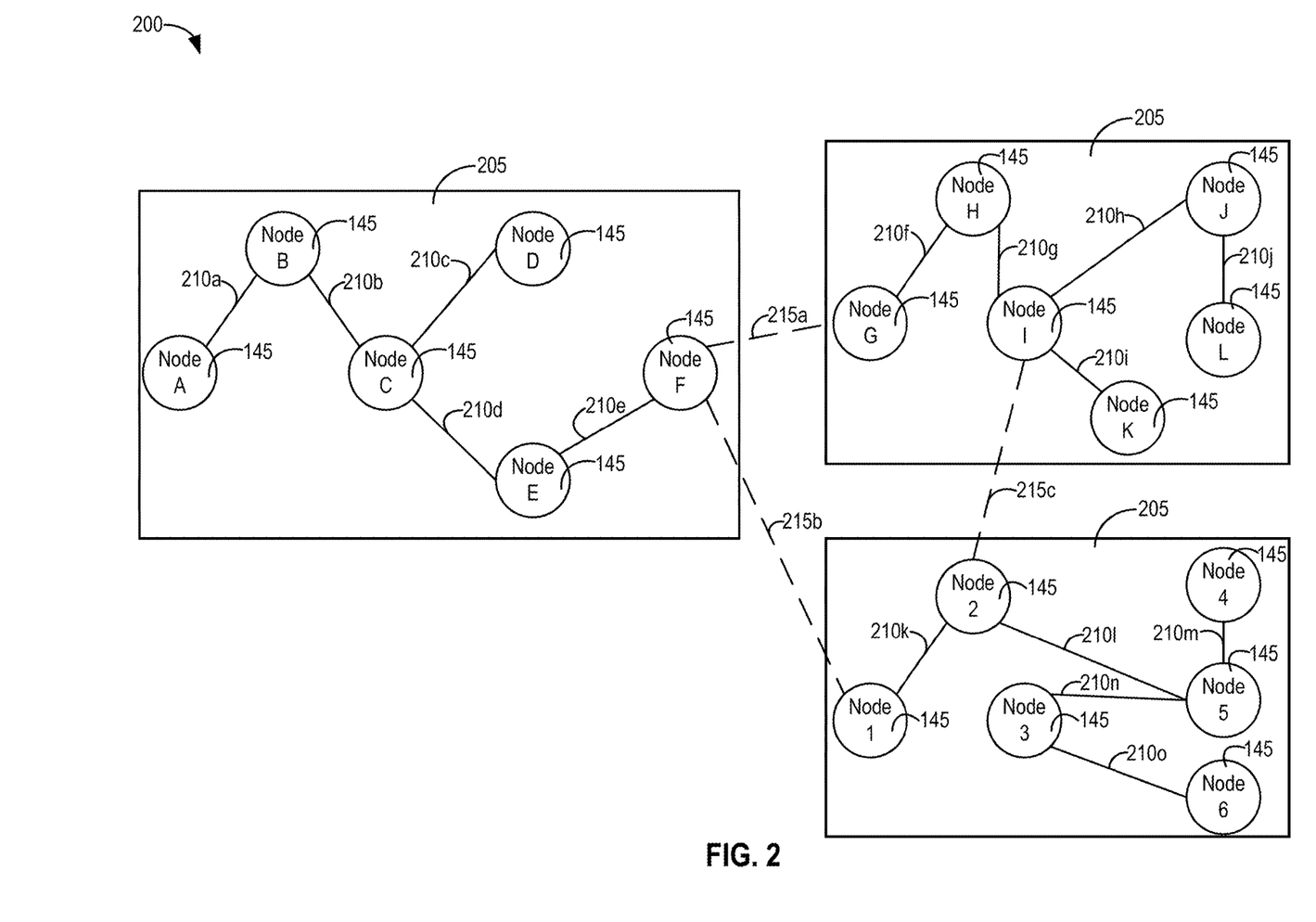
FIG. 2 is a block diagram of a network topology including one or more nodes to illustrate equipment connected to the network, according to some embodiments.

FIG. 2 depicts a block diagram of a network topology 200, according to some embodiments. In some embodiments, the network topology 200 may refer to and/or include the graph described herein. In some embodiments, the network topology 200 may be included in and/or correspond to the network 135. In some embodiments, the node module 125 may generate and/or establish the network topology 200.

In some embodiments, the network topology 200 may include one or more sections 205. For example, the network topology 200 may include a first section 205 and second section 205. In some embodiments, respective FMSs 105 may define and/or establish given sections 205 of the network topology 200. For example, a first FMS 105 may define the first section 205 and a second FMS 105 may define a second section 205. In some embodiments, the sections 205 may refer to and/or include the sections described herein. For example, the sections 205 may include network domains.

In some embodiments, the sections 205 may include the nodes 145. For example, a first section 205 may include nodes A, B, C, D, E, and F. As another example, a second section 205 may include nodes G, H, I, J, K, L. As another example, a third section 205 may include nodes 1, 2, 3, 4, 5, 6. In some embodiments, the nodes 145 may be connected with one another via one or more links. For example, a first node 145 may be connected to a second node 145 via a first link. In some embodiments, the network topology 200 may include one or more links 210 and/or one or more links 215.

In some embodiments, the links 210 may represent connections between nodes within a single section. For example, links 210*a*, 210*b*, 210*c*, 210*d*, and 210*e* represent connections between nodes 145 of the first section 205. In some embodiments, the links 215 may represents connections between nodes that include two or more sections. For example, links 215*a*, 215*b*, and 215*c* may represent links that include and/or connect nodes 145 from two or more sections 205. As another example, the link 215a may represent a connection between node F and node G. As shown in FIG. 2, node F is included in the first section 205 and node G is included in the second section 205.

In some embodiments, the node module 125 may monitor communication across the network 135. For example, the node module 125 may monitor communications via the network topology 200. In some embodiments, the node module 125 may monitor communications to detect one or more faults. For example, the node module 125 may detect that a given node 145 is non-responsive. As another example, the node module 125 may detect that a given node 145 is failing to connect to the network 135.

In some embodiments, the node module 125 may generate the network topology 200 by repeating and/or subsequently performing at least one of the steps and/or processes described herein. For example, the node module 125 may generate the network topology 200 by detecting pieces of equipment 140 and prompt the equipment 140 for information relating to their neighbors. As another example, the node module 125 may subsequently query the one or more FMSs 105 to identify neighbor nodes.

In some embodiments, the node module 125 may generate one or more nodes. For example, the node module 125 may generate temporary nodes. In some embodiments, the temporary nodes may be represented by one or more nodes 145. In some embodiments, the node module 125 may generate the temporary nodes to identify one or more pieces of equipment 140. For example, the node module 125 may generate temporary nodes to identify neighbors whose information (e.g., chassis ID) were absent from the cache. In some embodiments, the node module 125 may store information related to the neighbor in the temporary node. For example, the node module 125 may store, in the temporary node, information that was provided by the first piece of equipment 140.

In some embodiments, the node module 125 may transmit the temporary node to the one or more FMSs 105. For example, the node module 125 may provide the information, included in the temporary node, to the one or more FMSs 105. In some embodiments, the node module 125 may transmit a message to request the one or more FMSs 105 to search their caches. In some embodiments, the node module 125 may replace the temporary node with a given node 145. For example, the node module 125 may receive a response, from the one or more FMSs 105, and the response may include information that identifies the piece of equipment that is represented by the temporary node. As another example, the response may identify a node that represents the piece of equipment and the node module 125 may replace the temporary node with the node that represents the piece of equipment.

Figure 3:
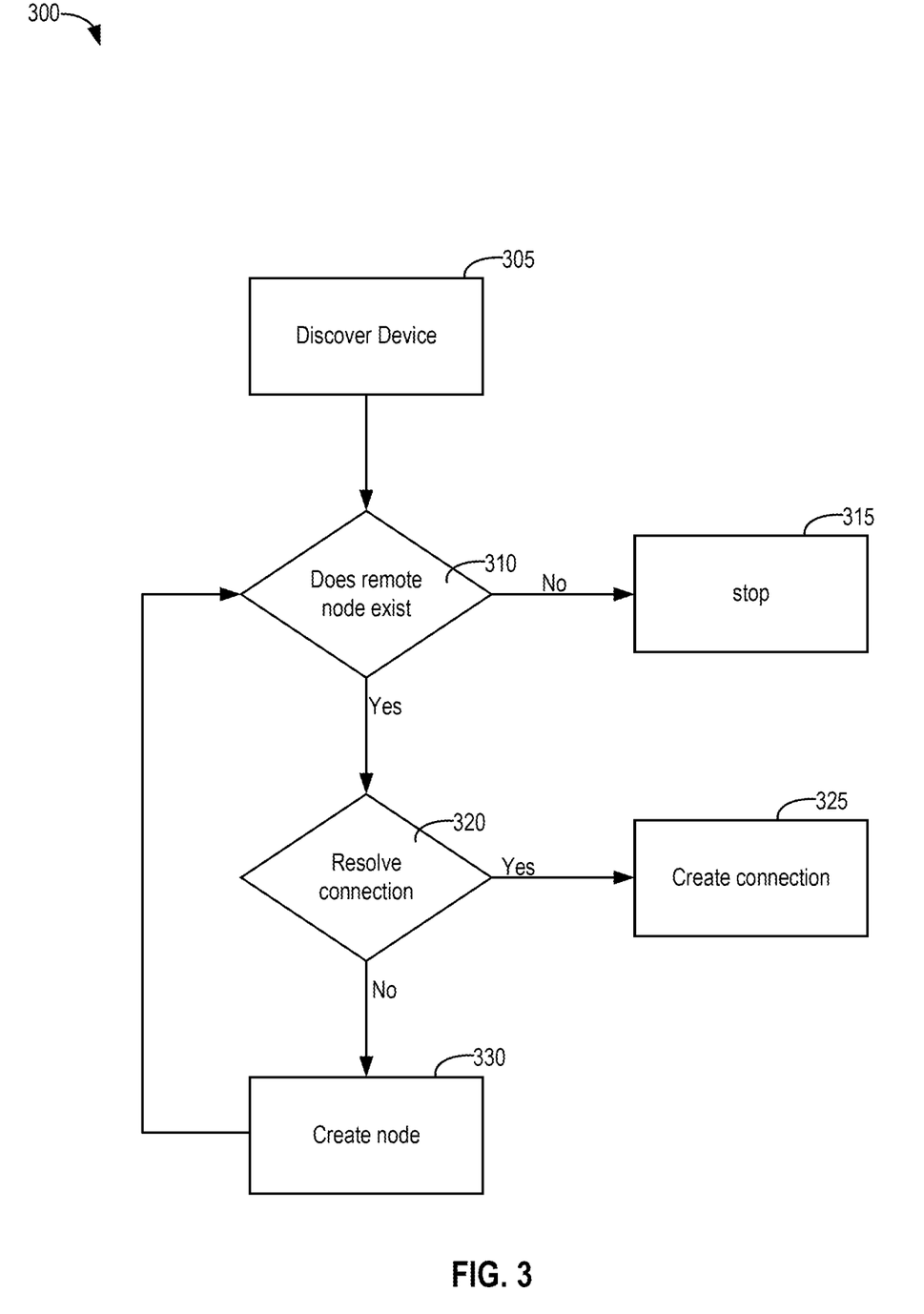
FIG. 3 is a flow diagram of a process to establish the network topology illustrated in FIG. 2, according to some embodiments.

FIG. 3 depicts a flow diagram of a process 300 to establish network topology 200, according to some embodiments. In some embodiments, at least one of the various systems, devices, and/or components described herein may perform at least one step of the process 300. For example, the FMS 105 may perform at least one of the steps of the process 300. While some steps of the process 300 are described as being performed by the node module 125, the processing circuit 110 may also perform some steps of the process 300.

In step 305, a device may be discovered, in some embodiments. For example, a piece of equipment 140 may be discovered. In some embodiments, the piece of equipment 140 may be discovered responsive to the piece of equipment 140 connecting to the network 135. In some embodiments, the node module 125 may discover the piece of equipment 140. For example, the node module 125 may identify an IP address that corresponds to the piece of equipment 140. In some embodiments, the process 300 may proceed to step 310.

In some embodiments, step 310 may include determining if a remote node exist. For example, the node module 125 may determine if the device, discovered in step 305, is included in a section 205 represented by the node module 125. In some embodiments, the node module 125 may determine that a remote node exists responsive to determining that the device is included in a subsequent section of the network 135. In some embodiments, the node module 125 may determine that a remote node does not exist. For example, the node module 125 may determine that the device, discovered in step 305, is represented by a node within a section 205 that is represented by the node module 125. In some embodiments, the process 300 may proceed to step 315 responsive to a determination that a remote does not exist. In some embodiments, the process 300 may proceed to step 320 responsive to a determination that a remote does exist.

In some embodiments, step 315 may include completing the process 300. For example, the process 300 may conclude, with respect to the device discovered in step 305, responsive to a determination that a remote node does not exist.

In some embodiments, step 320 may include determining if a connection will be resolved. For example, the node module 125 may determine that the device discovered in step 310 includes a neighbor (e.g., a second piece of equipment 140). To continue this example, the node module 125 may determine to resolve the connection responsive to the node module 125 identifying and/or knowing the neighbor. As another, the node module 125 may determine not to resolve the connection responsive to the node module 125 determining that the neighbor is an unknown piece of equipment. In some embodiments, the process 300 may proceed to step 325 responsive to a determination to resolve a connection. In some embodiments, the process 300 may proceed to step 330 responsive to a determination to not resolve the connection.

In some embodiments, step 325 may include creating a connection. For example, the node module 125 may create a connection (e.g., a link) between the device discovered in step 305 and the neighbor. As another example, the node module 125 may create a link 215 between the first piece of equipment 140 and the second piece of equipment 140.

In some embodiments, step 330 may include creating a node. For example, the node module 125 may create a temporary node 145 to represent the unknown piece of equipment 140. To continue this example, the node module 125 may query the one or more FMSs 105 to provide information that relates to the temporary node 145. Furthermore, the node module 125 may receive one or more responses from the one or more FMSs 105. In some embodiments, the process 300 may proceed to step 310. In some embodiments, the node module 125 may determine if a remote node exists based on information included in the responses.

Figure 4:
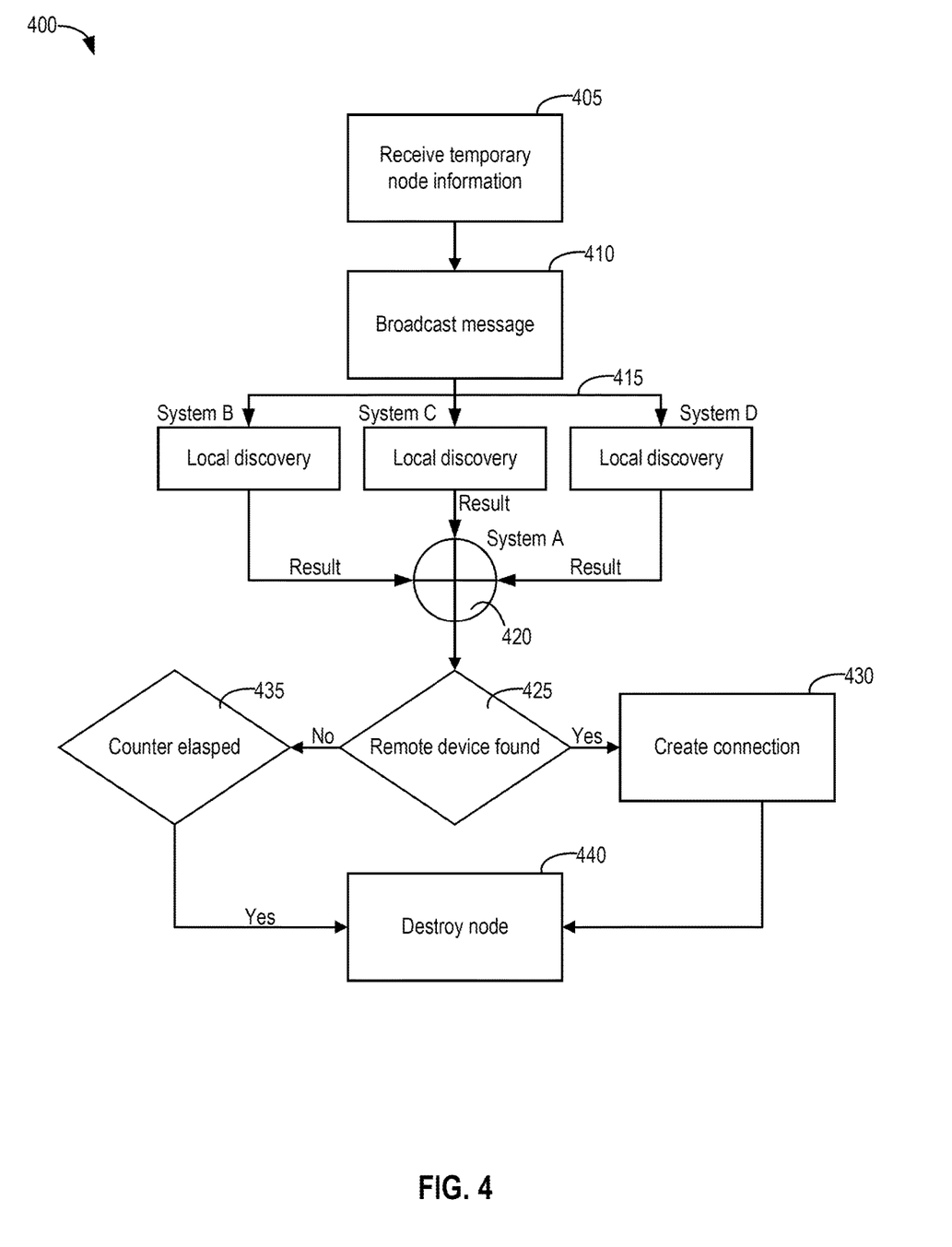
FIG. 4 is a flow diagram of a process to establish the network topology illustrated in FIG. 2, according to some embodiments.

FIG. 4 depicts a flow diagram of a process 400 to establish the network topology 200, in some embodiments. In some embodiments, at least one of the various systems, devices, and/or components described herein may perform at least one step of the process 400. For example, the FMS 105 may perform at least one of the steps of the process 400. While one or more steps of the process 300 are described as being performed by the node module 125, the processing circuit 110 may also perform one or more steps of the process 400.

In some embodiments, step 405 may include receiving temporary node information. For example, step 405 may include receiving information pertaining to the temporary node 145 that was created in step 330. In some embodiments, the temporary node information may be received by the one or more FMSs 105. In some embodiments, the process 400 may proceed to step 410.

In some embodiments, step 410 may include broadcasting a message. For example, the node module 125 may broadcast a message to the one or more FMSs 105. As another example, the FMSs 105 may broadcast a message to prompt one or more pieces of equipment 140 for information that pertains to the temporary node 145. In some embodiments, the process 400 may proceed to step 415.

In some embodiments, step 415 may include local discovery. For example, the one or more FMSs 105 may examine and/or analyze their caches. To continue this example, the one or more FMSs 105 may identify, based on information in their caches, the piece of equipment 140 that is represented by the temporary node 145. In some embodiments, the process 400 may proceed to step 420.

In some embodiments, step 420 may include receiving one or more results of the local discovery. For example, the node module 125 may receive one or more responses from the one or more FMSs 105. In some embodiments, the responses may include information to identify the piece of equipment 140. For example, a given FMS 105 may determine that the piece of equipment 140 is included a section 205 that is represented by the given FMS 105. To continue this example, the given FMS 105 may provide, to the node module 125, information that is stored in the given FMS 105 cache. In some embodiments, the process 400 may proceed to step 425.

In some embodiments, step 425 may include determining if a remote device was found. For example, the node module 125 may determine that a remote was found responsive to the responses, received in step 420, including information that identifies a piece of equipment 140. As another example, the node module 125 may determine that a piece of equipment 140 that is represented by the temporary node 145 was identified by the one or more FMSs 105. In some embodiments, the step 425 may refer to and/or include the step 310. For example, the step 425 may include determining if a remote node exists. In some embodiments, the process 400 may proceed to step 430 responsive to determining that a remote was found. In some embodiments, the process 400 may proceed to step 435 responsive to a determination that the remote device was not found.

In some embodiments, step 430 may include creating a connection. For example, the node module 125 may connect the remote device, that was found in step 425, with one or more pieces of equipment 140. In some embodiments, step 430 may refer to and/or include step 325. For example, the node module 125 may create a link 215 between the remote device, that was found in step 425, and one or more pieces of equipment 140. In some embodiments, the process 400 may proceed to step 440.

In some embodiments, step 435 may include determining in a counter has elapsed. For example, when the node module 125 creates a temporary node 145, the node module 125 may establish and/or determine an amount of time (e.g., a counter) for which the temporary node will be active. As another example, the node module 125 may determine that a temporary node will be active for five minutes. In some embodiments, the temporary node may be active for a predetermined amount of time. In some embodiments, the process 400 may proceed to step 440.

In some embodiments, step 440 may include destroying a node. For example, the node module 125 may destroy a temporary node responsive to determining, in step 435, that the counter elapsed. As another example, the node module 125 may destroy a temporary node responsive to creating, in step 430, a connection between the device discovered in step 425 and one or more pieces of equipment 140.

Figure 5:
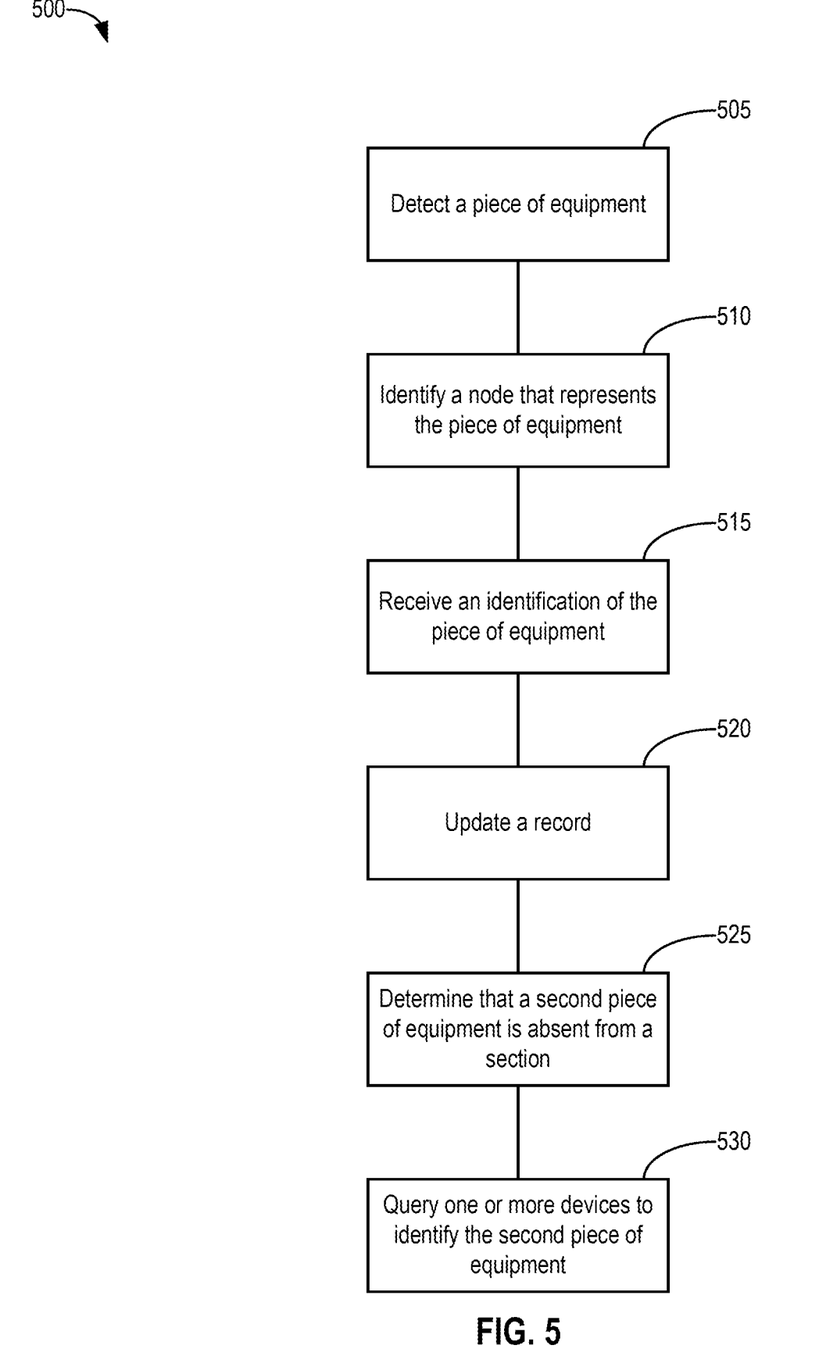
FIG. 5 is a flow diagram of a process to determine relationships between one or more pieces of equipment included in the network topology illustrated in FIG. 2, according to some embodiments.

FIG. 5 depicts a block diagram of a process 500 to determine relationships between one or more pieces of equipment included in the network topology 200, in some embodiments. In some embodiments, at least one step of the process 500 may performed by at least one of the systems, devices, and/or devices described herein. For example, the FMS 105 may perform at least one step of the process 500. While some step of the process 500 are described as being performed by the node module 125, the processing circuit 110 may perform at least one step of the process 500.

In some embodiments, step 505 may include detecting a piece of equipment. For example, the node module 125 may detect a first piece of equipment 140. In some embodiments, the first piece of equipment 140 may be connected to a network. For example, the first piece of equipment 140 may be connected to the network 135. In some embodiments, the node module 125 may detect the first piece of equipment 140 responsive to the first piece of equipment 140 connecting to the network 135. In some embodiments, the node module 125 may represent a given section 205 and the first piece of equipment 140 may be included in the given section 205.

In some embodiments, step 510 may include identifying a node that represents the first piece of equipment. For example, the node module 125 may identify a given node 145 that represents the first piece of equipment 140. In some embodiments, the node module 125 may identify the given node 145 responsive to detecting the first piece of equipment in step 505. For example, the node module 125 may identify the given node 145 based on information that pertains to the first piece of equipment 140.

In some embodiments, step 515 may include receiving an identification of the first piece of equipment. For example, the node module 125 may receive, from the first piece of equipment 140, information that identifies the first piece of equipment 140. As another example, the node module 125 may receive the identification of the first piece of equipment responsive to the node module 125 prompting the first piece of equipment.

In some embodiments, step 520 may include updating a record. For example, the node module 125 may update a cache (e.g., a record) to include the identification that was received in step 515. In some embodiments, the node module 125 may update the record to include the identification of the piece of equipment and an indication of a given node. For example, the node module 125 may update the cache to include an identification of the device detected in step 505 and to include the node identified in step 510.

In some embodiments, step 525 may include determining that a second piece of equipment is absent from a section. For example, the node module 125 may determine that the identification, received in step 515, includes information that identifies a neighbor (e.g., the second piece of equipment). To continue this example, the node module 125 may determine, based on the information that identifies the neighbor, that the neighbor is absent from a given section 205. Stated otherwise, the node module 125 may determine that neighbor is included in a second section 205.

In some embodiments, step 530 may include querying one or more devices to identify the second piece of equipment. For example, the node module 125 may query the one or more FMSs 105. As another example, the node module 125 may generate a temporary node and the node module 125 may transmit a message to prompt the one or more FMSs 105 for information to identify the second piece of equipment.

The hardware systems described herein may be implemented in many different ways and in many different combinations of hardware and software and circuit designs. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLO), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples. In some embodiments, the circuitry can be provided on one or more integrated circuit dies in an integrated circuit package. The integrated circuit package can be a combination of two or more packages in some embodiments.

The circuitry may further include or access instructions (e.g., software or firmware) for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HOD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. The term "electrically decoupled" and variations thereof includes the disjoining (e.g., temporarily or permanently) of two members directly or indirectly to one another in some embodiments. Coupling and decoupling can be performed using a switch (e.g., a transistor).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a stand-alone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system, comprising:
    a plurality of nodes distributed across a network, wherein respective nodes of the plurality of nodes represent respective pieces of equipment of a plurality of pieces of equipment connected to the network; and
    a first device configured to monitor a first section of a plurality of sections of the network, wherein each section of the plurality of sections of the network operates a respective network domain and includes a respective device of a plurality of devices including the first device, and wherein the first device includes one or more circuits configured to:
        detect, within the first section, a first piece of equipment of the plurality of pieces of equipment;
        identify a first node of the plurality of nodes that represents the first piece of equipment of the plurality of pieces of equipment;
        receive, from the first piece of equipment of the plurality of pieces of equipment, an identification of the first piece of equipment of the plurality of pieces of equipment;
        update, responsive to receipt of the identification of the first piece of equipment, in a database, a record to include (i) the identification of the first piece of equipment of the plurality of pieces of equipment and (ii) an indication that the first node of the plurality of nodes represents the first piece of equipment of the plurality of pieces of equipment;
        determine, based on information that identifies a second piece of equipment of the plurality of pieces of equipment, that the second piece of equipment of the plurality of pieces of equipment is absent from the first section of the plurality of sections, wherein the information that identifies the second piece of equipment of the plurality of pieces of equipment is (i) received from the first piece of equipment of the plurality of pieces of equipment and (ii) obtained by the first piece of equipment responsive to establishment of a connection between the first piece of equipment and the second piece of equipment; and
        transmit, responsive to determination that the second piece of equipment of the plurality of pieces of equipment is absent from the first section of the plurality of sections, via the network, a query to one or more devices of the plurality of devices that monitor one or more second sections of the plurality of sections to identify the second piece of equipment of the plurality of pieces of equipment.

2. The system of claim 1, wherein the one or more circuits are further configured to:
    receive, responsive to transmission of the query to the one or more devices of the plurality of devices, a response that identifies the second piece of equipment of the plurality of pieces of equipment, wherein the response includes:
        an identification of the second piece of equipment of the plurality of pieces of equipment; and
        an indication of a given section of the plurality of sections that includes the second piece of equipment of the plurality of pieces of equipment; and
    update, responsive to receipt of the response, the record to include the identification of the second piece of equipment of the plurality of pieces of equipment and the indication of the given section of the plurality of sections.

3. The system of claim 1, wherein the one or more circuits are further configured to:
    generate a node to store the information that identifies the second piece of equipment of the plurality of pieces of equipment, wherein the node is included with the plurality of nodes for a predetermined amount of time;
    transmit a message to request the one or more devices to search respective records that include information pertaining to one or more pieces of equipment of the plurality of pieces of equipment that are included in respective sections of the plurality of sections; and
    replace, responsive to receipt of a response that identifies the second piece of equipment of the plurality of pieces of equipment, the node with a second node to link the first piece of equipment of the plurality of pieces of equipment with the second piece of equipment of the plurality of pieces of equipment, wherein the second node was previously unknown by the first device of the plurality of devices.

4. The system of claim 1, wherein the one or more circuits are further configured to:
    generate a graph to illustrate the plurality of nodes distributed across the network, wherein the graph includes a plurality of links between respective pieces of equipment of the plurality of pieces of equipment, wherein a link of the plurality of links between the first piece of equipment of the plurality of pieces of equipment and the second piece of equipment of the plurality of pieces of equipment represents that the first piece of equipment of the plurality of pieces of equipment is a neighbor to the second piece of equipment of the plurality of pieces of equipment; and
    update, responsive to receipt of a response to the query, the graph to include a second link between the second piece of equipment of the plurality of pieces of equipment and one or more third pieces of equipment of the plurality of pieces of equipment;
    wherein the link between the first piece of equipment of the plurality of pieces of equipment and the second piece of equipment of the plurality of pieces of equipment and the second link between the second piece of equipment of the plurality of pieces of equipment and the one or more third pieces of equipment of the plurality of pieces of equipment represent connections between two or more sections of the plurality of sections.

5. The system of claim 4, wherein the one or more circuits are further configured to:
    detect, using the graph, a plurality of faults across the network; and
    implement, responsive to detection of the plurality of faults, responses to address the plurality of faults across the network;
    wherein a first fault of the plurality of faults is associated with at least one section of the plurality of sections that is different from the first section of the plurality of sections.

6. The system of claim 1, wherein the one or more circuits are further configured to:
    receive, responsive to transmission of the query to the one or more devices of the plurality of devices, a response that identifies the second piece of equipment of the plurality of pieces of equipment;

identify, responsive to receipt of the response, one or more third pieces of equipment of the plurality of pieces of equipment that are connected to the second piece of equipment of the plurality of pieces of equipment via respective nodes of the plurality of nodes; and update a graph to include (i) a first link between the first piece of equipment of the plurality of pieces of equipment and the second piece of equipment of the plurality of pieces of equipment and (ii) one or more second links between the second piece of equipment of the plurality of pieces of equipment and the one or more third pieces of equipment of the plurality of pieces of equipment.

7. The system of claim 6, wherein the one or more circuits are further configured to:

detect a fourth piece of equipment of the plurality of pieces of equipment;

identify a second node of the plurality of nodes that represents the fourth piece of equipment of the plurality of pieces of equipment; and determine, responsive to identification of the fourth piece of equipment of the plurality of pieces of equipment, that a fifth piece of equipment of the plurality of pieces of equipment connects the first piece of equipment of the plurality of pieces of equipment with the fourth piece of equipment of the plurality of pieces of equipment.

8. The system of claim 1, wherein the one or more circuits are further configured to:

monitor, via a graph including links between the plurality of nodes, communication across the network to detect one or more faults;

wherein the graph is generated by the one or more circuits by subsequent queries to the one or more devices of the plurality of devices responsive to determinations that one or more given devices of the plurality of devices are absent from the first section of the plurality of sections.

9. The system of claim 1, wherein the one or more circuits are further configured to:

provide a prompt to the first piece of equipment of the plurality of pieces of equipment for the information that identifies the second piece of equipment of the plurality of pieces of equipment, wherein the second piece of equipment of the plurality of pieces of equipment is in communication, via the network, with the first piece of equipment of the plurality of pieces of equipment;

wherein the first piece of equipment of the plurality of pieces of equipment is detected via a first protocol;

wherein the prompt to the first piece of equipment of the plurality of pieces of equipment is provided via a second protocol; and wherein the first protocol and the second protocol are different.

10. A device to monitor a first section of a plurality of sections of a network, wherein each section of the plurality of sections operates a respective network domain and includes a respective device of a plurality of devices including the device, wherein the network comprises a plurality of nodes distributed across the network, wherein respective nodes of the plurality of nodes represent respective pieces of equipment of a plurality of pieces of equipment connected to the network, and wherein the device includes one or more circuits configured to:

detect, within the first section, a first piece of equipment of the plurality of pieces of equipment;

identify a first node of the plurality of nodes that represents the first piece of equipment of the plurality of pieces of equipment;

receive, from the first piece of equipment of the plurality of pieces of equipment, an identification of the first piece of equipment of the plurality of pieces of equipment;

update, responsive to receipt of the identification of the first piece of equipment, in a database, a record to include (i) the identification of the first piece of equipment of the plurality of pieces of equipment and (ii) an indication that the first node of the plurality of nodes represents the first piece of equipment of the plurality of pieces of equipment;

determine, based on information that identifies a second piece of equipment of the plurality of pieces of equipment, that the second piece of equipment of the plurality of pieces of equipment is absent from the first section of the plurality of sections, wherein the information that identifies the second piece of equipment of the plurality of pieces of equipment is (ii) received from the first piece of equipment of the plurality of pieces of equipment and (ii) obtained by the first piece of equipment responsive to establishment of a connection between the first piece of equipment and the second piece of equipment; and transmit, responsive to determination that the second piece of equipment of the plurality of pieces of equipment is absent from the first section of the plurality of sections, via the network, a query to one or more devices of the plurality of devices to identify the second piece of equipment of the plurality of pieces of equipment.

11. The device of claim 10, wherein the one or more circuits are further configured to:

receive, responsive to transmission of the query to the one or more devices of the plurality of devices, a response that identifies the second piece of equipment of the plurality of pieces of equipment, wherein the response includes:

an identification of the second piece of equipment of the plurality of pieces of equipment; and an indication of a given section of the plurality of sections that includes the second piece of equipment of the plurality of pieces of equipment; and update, responsive to receipt of the response, the record to include the identification of the second piece of equipment of the plurality of pieces of equipment and the indication of the given section of the plurality of sections.

12. The device of claim 10, wherein the one or more circuits are further configured to:

generate a node to store the information that identifies the second piece of equipment of the plurality of pieces of equipment, wherein the node is included with the plurality of nodes for a predetermined amount of time;

transmit a message to request the one or more devices to search respective records that include information pertaining to one or more pieces of equipment of the plurality of pieces of equipment that are included in respective sections of the plurality of sections; and replace, responsive to receipt of a response that identifies the second piece of equipment of the plurality of pieces of equipment, the node with a second node to link the first piece of equipment of the plurality of pieces of equipment with the second piece of equipment of the plurality of pieces of equipment, wherein the second node was previously unknown by the device.

13. The device of claim 10, wherein the one or more circuits are further configured to:
generate a graph to illustrate the plurality of nodes distributed across the network, wherein the graph includes a plurality of links between respective pieces of equipment of the plurality of pieces of equipment, wherein a link of the plurality of links between the first piece of equipment of the plurality of pieces of equipment and the second piece of equipment of the plurality of pieces of equipment represents that the first piece of equipment of the plurality of pieces of equipment is a neighbor to the second piece of equipment of the plurality of pieces of equipment; and
update, responsive to receipt of a response to the query, the graph to include a second link between the second piece of equipment of the plurality of pieces of equipment and one or more third pieces of equipment of the plurality of pieces of equipment;
wherein the link between the first piece of equipment of the plurality of pieces of equipment and the second piece of equipment of the plurality of pieces of equipment and the second link between the second piece of equipment of the plurality of pieces of equipment and the one or more third pieces of equipment of the plurality of pieces of equipment represent connections between two or more sections of the plurality of sections.

14. The device of claim 10, wherein the one or more circuits are further configured to:
detect, using a graph generated by the device, a plurality of faults across the network; and
implement, responsive to detection of the plurality of faults, responses to address the plurality of faults across the network;
wherein a first fault of the plurality of faults is associated with at least one section of the plurality of sections that is different from the first section of the plurality of sections.

15. The device of claim 10, wherein the one or more circuits are further configured to:
receive, responsive to transmission of the query to the one or more devices of the plurality of devices, a response that identifies the second piece of equipment of the plurality of pieces of equipment;
identify, responsive to receipt of the response, one or more third pieces of equipment of the plurality of pieces of equipment that are connected to the second piece of equipment of the plurality of pieces of equipment via respective nodes of the plurality of nodes; and
update a graph to include (i) a first link between the first piece of equipment of the plurality of pieces of equipment and the second piece of equipment of the plurality of pieces of equipment and (ii) one or more second links between the second piece of equipment of the plurality of pieces of equipment and the one or more third pieces of equipment of the plurality of pieces of equipment.

16. The device of claim 15, wherein the one or more circuits are further configured to:
detect a fourth piece of equipment of the plurality of pieces of equipment;
identify a second node of the plurality of nodes that represents the fourth piece of equipment of the plurality of pieces of equipment; and
determine, responsive to identification of the fourth piece of equipment of the plurality of pieces of equipment, that a fifth piece of equipment of the plurality of pieces of equipment connects the first piece of equipment of the plurality of pieces of equipment with the fourth piece of equipment of the plurality of pieces of equipment.

17. The device of claim 10, wherein the one or more circuits are further configured to:
monitor, via a graph including links between the plurality of nodes, communication across the network to detect one or more faults;
wherein the graph is generated by the one or more circuits by subsequent queries to the one or more devices of the plurality of devices responsive to determinations that one or more given devices of the plurality of devices are absent from the first section of the plurality of sections.

18. A method, comprising:
detecting, by one or more circuits of a first device, within a first section of a plurality of sections, a first piece of equipment of a plurality of pieces of equipment, wherein the plurality of pieces of equipment are connected to a network, wherein each section of the plurality of sections operates a respective network domain and includes a respective device of a plurality of devices including the first device;
identifying, by the one or more circuits of the first device, a first node of a plurality of nodes that represents the first piece of equipment of the plurality of pieces of equipment, wherein the plurality of nodes are distributed across the network, and wherein respective nodes of the plurality of nodes represent respective pieces of equipment of the plurality of pieces of equipment;
receiving, by the one or more circuits of the first device, from the first piece of equipment of the plurality of pieces of equipment, an identification of the first piece of equipment of the plurality of pieces of equipment;
updating, by the one or more circuits of the first device, responsive to receipt of the identification, in a database, a record to include (i) the identification of the first piece of equipment of the plurality of pieces of equipment and (ii) an indication that a given node of the plurality of nodes represents the first piece of equipment of the plurality of pieces of equipment;
determining, by the one or more circuits of the first device, based on information that identifies a second piece of equipment of the plurality of pieces of equipment, that the second piece of equipment of the plurality of pieces of equipment is absent from the first section of the plurality of sections, wherein the information that identifies the second piece of equipment of the plurality of pieces of equipment is (i) received from the first piece of equipment of the plurality of pieces of equipment and (ii) obtained by the first piece of equipment responsive to establishment of a connection between the first piece of equipment and the second piece of equipment; and
transmitting, by the one or more circuits of the first device, responsive to determination that the second piece of equipment of the plurality of pieces of equipment is absent from the first section of the plurality of sections, via the network, a query to one or more devices of a plurality of devices to identify the second piece of equipment of the plurality of pieces of equipment.

19. The method of claim 18, further comprising:
generating, by the one or more circuits of the first device, a graph to illustrate the plurality of nodes distributed across the network, wherein the graph includes a plurality of links between the respective pieces of equipment of the plurality of pieces of equipment, wherein a link of the plurality of links between the first piece of equipment of the plurality of pieces of equipment and the second piece of equipment of the plurality of pieces of equipment represents that the first piece of equipment of the plurality of pieces of equipment is a neighbor to the second piece of equipment of the plurality of pieces of equipment; and
updating, by the one or more circuits of the first device, responsive to receipt of a response to the query, the graph to include a second link between the second piece of equipment of the plurality of pieces of equipment and one or more third pieces of equipment of the plurality of pieces of equipment;
    wherein the link between the first piece of equipment of the plurality of pieces of equipment and the second piece of equipment of the plurality of pieces of equipment and the second link between the second piece of equipment of the plurality of pieces of equipment and the one or more third pieces of equipment of the plurality of pieces of equipment represent connections between two or more sections of the plurality of sections.

20. The method of claim 19, further comprising:
detecting, by the one or more circuits of the first device, using the graph, a plurality of faults across the network; and
implementing, by the one or more circuits of the first device, responsive to detecting the plurality of faults, responses to address the plurality of faults across the network;
wherein a first fault of the plurality of faults is associated with at least one section of the plurality of sections that is different from the first section of the plurality of sections.

* * * * *